United States Patent
Bonin et al.

(10) Patent No.: US 9,186,697 B2
(45) Date of Patent: Nov. 17, 2015

(54) METHODS FOR APPLYING POLYMER-MODIFIED WET CONCRETE MIXTURES

(75) Inventors: Klaus Bonin, Burghausen (DE); Jürgen Bezler, Burghausen (DE)

(73) Assignee: Wacker Chemie AG, Munich (DE)

( * ) Notice: Subject to any disclaimer, the term of this patent is extended or adjusted under 35 U.S.C. 154(b) by 786 days.

(21) Appl. No.: 13/127,932

(22) PCT Filed: Oct. 23, 2009

(86) PCT No.: PCT/EP2009/063972
§ 371 (c)(1),
(2), (4) Date: May 5, 2011

(87) PCT Pub. No.: WO2010/052136
PCT Pub. Date: May 14, 2010

(65) Prior Publication Data
US 2011/0217475 A1    Sep. 8, 2011

(30) Foreign Application Priority Data
Nov. 6, 2008  (DE) .......................... 10 2008 043 516

(51) Int. Cl.
*B05D 1/02* (2006.01)
*C04B 24/26* (2006.01)
*C04B 28/02* (2006.01)
*E21D 11/10* (2006.01)
*C04B 103/00* (2006.01)
*C04B 111/00* (2006.01)

(52) U.S. Cl.
CPC .............. *B05D 1/02* (2013.01); *C04B 24/2623* (2013.01); *C04B 28/02* (2013.01); *E21D 11/105* (2013.01); *C04B 2103/0065* (2013.01); *C04B 2111/00172* (2013.01); *C04B 2111/00577* (2013.01); *Y02W 30/92* (2015.05)

(58) Field of Classification Search
None
See application file for complete search history.

(56) References Cited

U.S. PATENT DOCUMENTS

| | | | | | |
|---|---|---|---|---|---|
| 4,158,737 | A | * | 6/1979 | Bartsch ......................... | 560/245 |
| 4,340,510 | A | * | 7/1982 | Howanietz et al. ............... | 524/5 |
| 5,395,658 | A | * | 3/1995 | Jaklin ......................... | 427/397.8 |
| 5,895,525 | A | * | 4/1999 | Huang et al. .................. | 106/696 |
| 6,185,891 | B1 | * | 2/2001 | Moore ......................... | 52/309.7 |
| 2007/0112117 | A1 | | 5/2007 | Weitzel | |
| 2009/0030168 | A1 | | 1/2009 | Schorm et al. | |
| 2010/0159147 | A1 | | 6/2010 | Bonin | |
| 2010/0303549 | A1 | | 12/2010 | Bonin et al. | |

FOREIGN PATENT DOCUMENTS

| | | | |
|---|---|---|---|
| CA | 2269513 | A1 * | 10/2000 |
| DE | 1099925 | B | 2/1961 |
| DE | 19723474 | A1 | 12/1998 |
| DE | 10 2006 007 282 | A1 | 8/2007 |
| DE | 10 2007 024 964 | A1 | 12/2008 |
| DE | 10 2007 024 965 | A1 | 12/2008 |
| EP | 0352585 | A2 | 1/1990 |
| EP | 1726432 | A1 | 11/2006 |
| JP | 60-152778 | A | 8/1985 |
| JP | 61-97152 | A | 5/1986 |
| JP | 63-2847 | A | 1/1988 |
| JP | 63-270334 | A | 11/1988 |
| JP | 4-149052 | A | 5/1992 |
| JP | 9-255387 | A | 9/1997 |
| JP | 2000-302509 | | 10/2000 |
| JP | 2000-302509 | A | 10/2000 |
| JP | 2003306369 | A2 | 10/2003 |
| JP | 2003306370 | A | 10/2003 |
| JP | 2004-51422 | A | 2/2004 |
| JP | 2007138175 | A | 6/2007 |
| WO | WO 02/083593 | A1 | 10/2002 |

OTHER PUBLICATIONS

Höfler et al.; Shotcrete in Tunnel Construction—Introduction to the basic technology of sprayed concrete; Putzmeister AG; Mar. 2004.*
How Concrete is Made; retrieved from http://www.cement.org/cement-concrete-basics/how-concrete-is-made on May 7, 2014.*
Fox T. G., Bull. Am. Physics Soc. 1, 3, p. 123 (1956).
W. A. Lee and R. A. Rutherford, Polymer Handbook 2nd Edition, J. Wiley & Sons, New York (1975).
Theodoridou, K, International Search Report dated Apr. 19, 2010, 3 pgs.
Chemical Abstracts, Bd. 117, Nr. 12, 21. Sep. 21, 1992, Columbus, Ohio, US; abstract No. 117218c, T. Mihara: "Spray materials for concrete repair and repair of concrete with the spray materials" p. 353; XP002576466.

* cited by examiner

*Primary Examiner* — Timothy Meeks
*Assistant Examiner* — Michael P Rodriguez
(74) *Attorney, Agent, or Firm* — RatnerPrestia

(57) ABSTRACT

The invention relates to methods for applying wet concrete mixtures containing cement, fillers, water, one or more polymers, and possibly further admixtures or additives according to the wet-mix shotcrete method, characterized in that the wet concrete mixtures, which contain at least one polymer based on one or more vinyl esters of unbranched or branched alkyl carboxylic acids having 1 to 15 C atoms and possibly one or more further ethylenically unsaturated monomers, are put into a concrete spraying machine and are applied to a subsurface by means of the wet-mix shotcrete method with a layer thickness of ≥3 cm.

9 Claims, No Drawings

METHODS FOR APPLYING POLYMER-MODIFIED WET CONCRETE MIXTURES

CROSS REFERENCE TO RELATED APPLICATIONS

This application is the national phase filing of international patent application No. PCT/EP2009/063972, filed 23 Oct. 2009, and claims priority of German patent application number 10 2008 043 516.3, filed 6 Nov. 2008, the entireties of which applications are incorporated herein by reference.

FIELD OF THE INVENTION

The invention relates to methods for applying polymer-modified wet concrete mixtures by wet shotcrete methods and to the use of the method, for example for the production of construction structures, in particular in the field of mine construction or tunnel construction.

BACKGROUND OF THE INVENTION

The usual methods for processing and applying concrete mixtures are shotcrete methods. In these, concrete mixtures are introduced into a concrete spraying machine with which the concrete mixtures are applied via a delivery line to the particular substrate by means of a spray nozzle. Concrete mixtures contain cement, fillers, such as sand or gravel, and optionally further additives.

Dry shotcrete methods and wet shotcrete methods are known in this context. In dry shotcrete methods, concrete mixtures are employed in the dry form (concrete dry mixtures). The concrete dry mixtures are mixed by addition of water in the spray nozzle. In the dry shotcrete method, the concrete compositions obtained in this way are thus sprayed on to a substrate immediately after mixing with water. Polymers, which can be contained in the concrete dry mixture or can also be added only in the spray nozzle, are examples of an additive for concrete mixtures. JP-A 61097152 and JP-A 60152778 disclose that by the use of vinyl acetate/ethylene/vinyl chloride terpolymers in the various dry shotcrete methods, the rebound on application of concrete mixtures to a substrate is reduced. To reduce the formation of dust when carrying out the dry shotcrete method and the associated health hazard to employees on the construction site, JP-A 09-255387 recommends the use of polymers, such as vinyl acetate/ethylene copolymers, in concrete mixtures. For this purpose, JP-A 63-270334 and JP-A 63-002847 propose vinyl acetate/ethylene copolymers which additionally contain units of ethylenically unsaturated carboxylic acids.

In wet shotcrete methods, concrete mixtures are introduced into the concrete spraying machine in an aqueous form (wet concrete mixtures). In this case, the concrete mixtures are thus first mixed with water and then introduced into the concrete spraying machine, with which the wet concrete mixtures are applied via a delivery line with a spray nozzle to a substrate. When the wet shotcrete method is employed for construction, polymers have hitherto been added in the spray nozzle.

JP-A 11-107506 describes wet shotcrete methods in which vinyl acetate/ethylene/acrylic acid ester terpolymers are added in the spray nozzle in order to reduce the rebound of the wet shotcrete when it impinges on the substrate. DE-A 102007024965 and. DE-A 102007024964 describe polymer-modified setting accelerators and the use thereof in wet shotcrete methods, the polymer-modified setting accelerators being admixed to the wet concrete mixtures in the spray nozzle. JP-A 2004-051422 discloses the use of repair concrete mixtures which are applied by wet shotcrete methods and, in addition to superfine $\gamma$-$Ca_2SiO_4$, contain vinyl acetate/ethylene copolymers as an additive. In this context, the repair concrete mixtures were employed for renovating concrete by the wet shotcrete methods with subsequent manual working with application thicknesses of up to 2 cm. Concrete compositions containing polyacrylamides with anionic comonomer units are known from EP-A 1726432 for the production of fireproof coatings. DE-A 19723474 describes dry and wet concrete mixtures with emulsifier-stabilized styrene/acrylic acid ester copolymers containing anionically charged monomer units. Such copolymers, nevertheless, are not stable in wet concrete mixtures, the storage stability and therefore the transportation stability as well as the use properties of the wet concrete mixtures suffering as a result. Furthermore, the anionic copolymers also act as plasticizers in wet concrete mixtures as a result of their negative charge. In practice, however, it is advantageous to be able to dose plasticizers and further additives independently of one another, in order to be able to establish precisely the desired concrete properties at each construction section of the particular construction site. Emulsifiers may also have a plasticizing action. The hardened concrete of DE-A 19723474 has an increased elasticity modulus (E modulus), and associated with this a lower elasticity, which can contribute towards cracking of the hardened concrete.

The concrete mixtures known to date and the application thereof by shotcrete methods lead to hardened concrete which is inadequate with respect to its impermeability to water. Hardened concrete is obtained by setting of wet concrete mixtures. Precisely in construction, such as, for example, in tunnel or mine construction, particularly high requirements are imposed on hardened concrete, since the hardened concrete is constantly in contact with, for example, rock or ground water, which furthermore changes markedly in its composition, such as its salt content, depending on the season and the local circumstances, and penetration of which into the hardened concrete severely damages this.

Against this background there was the object of providing hardened concrete which is distinguished by a relatively high impermeability to water and which also overcomes the further problems mentioned above.

SUMMARY OF THE INVENTION

The object according to the invention has been achieved, surprisingly, by introducing polymer-modified wet concrete mixtures into concrete spraying machines and applying them by the wet shotcrete method with application thicknesses of $\geq 3$ cm. According to the invention, the polymers are thus not first added to the wet concrete mixtures in the spray nozzle.

DETAILED DESCRIPTION OF THE INVENTION

The invention relates to methods for applying wet concrete mixtures containing cement, fillers, water, one or more polymers and optionally further additional substances or additives by the wet shotcrete method, characterized in that
the wet concrete mixtures, which contain at least one polymer based on one or more vinyl esters of unbranched or branched alkylcarboxylic acids having 1 to 15 C atoms and optionally one or more further ethylenically unsaturated monomers, are introduced into a concrete spraying machine and applied to a substrate by means of a wet shotcrete method with a layer thickness of ≥3 cm.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 9 to 13 C atoms, for example VeoVa9® or VeoVa10® (trade names of Shell). Vinyl acetate is particularly preferred.

The further ethylenically unsaturated monomers for the preparation of the polymers are preferably chosen from the group comprising methacrylic acid esters and acrylic acid esters of alcohols having 1 to 15 C atoms, vinylaromatics, olefins, dienes or vinyl halides.

Preferred methacrylic acid esters or acrylic acid esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate. Methyl acrylate, methyl methacrylate, n-butyl acrylate and 2-ethylhexyl acrylate are particularly preferred. Examples of olefins and dienes are ethylene, propylene and 1,3-butadiene. Suitable vinylaromatics are, for example, styrene and vinyltoluene. A suitable vinyl halide is vinyl chloride. Ethylenically unsaturated, anionic monomers are employed for the preparation of the polymers preferably to the extent of ≤5 wt. %, particularly preferably to the extent of ≤1 wt. % and most preferably to the extent of ≤0.1 wt. %, the amounts in wt. % in each case being based on the total weight of the monomers for the preparation of the polymers. Anionic monomers are those which are present in distilled water at least in a proportion as negatively charged, ethylenically unsaturated compounds, such as, for example, ethylenically unsaturated carboxylic acids or sulfonic acids. Ethylenically unsaturated, cationic monomers are preferably employed to the extent of ≤5 wt. %, particularly preferably to the extent of ≤1 wt. % and most preferably to the extent of ≤0.1 wt. %, the amounts in wt. % in each case being based on the total weight of the monomers for the preparation of the polymers. Cationic monomers are those which are present in distilled water at least in a proportion as positively charged, ethylenically unsaturated compounds, such as, for example, ethylenically unsaturated amines.

Examples of homo- and copolymers which are suitable as the polymer are vinyl acetate homopolymers, copolymers of vinyl acetate with ethylene, copolymers of vinyl acetate with ethylene and one or more further vinyl esters, copolymers of vinyl acetate with ethylene and acrylic acid esters and copolymers of vinyl acetate with ethylene and vinyl chloride.

Preferred polymers are vinyl acetate homopolymers; copolymers of vinyl acetate with 1 to 40 wt. % of ethylene; copolymers of vinyl acetate with 1 to 40 wt. % of ethylene and
  1 to 50 wt. % of one or more further comonomers from the group of vinyl esters having 1 to 15 C atoms in the carboxylic acid radical, such as vinyl propionate, vinyl dodecanoate, vinyl esters of alpha-branched carboxylic acids having 9 to 13 C atoms, such as VeoVa9®, VeoVa10®, VeoVa11®;
copolymers of vinyl acetate, 1 to 40 wt. % of ethylene and
  preferably 1 to 60 wt. % of acrylic acid esters of unbranched or branched alcohols having 1 to 15 C atoms, in particular n-butyl acrylate or 2-ethylhexyl acrylate; and
copolymers with 30 to 75 wt. % of vinyl acetate, 1 to 30 wt. % of vinyl laurate or vinyl esters of an alpha-branched carboxylic acid having 9 to 13 C atoms, as well as 1 to 30 wt. % of acrylic acid esters of unbranched or branched alcohols having 1 to 15 C atoms, in particular n-butyl acrylate or 2-ethylhexyl acrylate, which also contain 1 to 40 wt. % of ethylene; copolymers with vinyl acetate, 1 to 40 wt. % of ethylene and 1 to 60 wt. % of vinyl chloride; it being possible for the polymers also to contain the auxiliary monomers mentioned in the amounts mentioned, and the amounts in wt. % in each case adding up to 100 wt. %.

Particularly preferred polymers are vinyl acetate homopolymers; copolymers of vinyl acetate with 1 to 40 wt. % of ethylene and optionally 1 to 50 wt. % of one or more further comonomers from the group of vinyl esters having 1 to 15 C atoms in the carboxylic acid radical, such as vinyl propionate, vinyl dodecanoate, vinyl esters of alpha-branched carboxylic acids having 9 to 13 C atoms, such as VeoVa9®, VeoVa10®, VeoVa11®.

The choice of monomer and the choice of the weight contents of the comonomers in this context is made such that the polymers in general have a glass transition temperature Tg of from $-50°$ C. to $+50°$ C., preferably $-30°$ C. to $+20°$ C., particularly preferably $-20°$ C. to $+5°$ C. and most preferably $-15°$ C. to $0°$ C. The glass transition temperature Tg of the polymers can be determined in a known manner by means of differential scanning calorimetry (DSC). The Tg can also be calculated approximately beforehand by means of the Fox equation. According to Fox T. G., Bull. Am. Physics Soc. 1, 3, page 123 (1956): $1/Tg = x1/Tg1 + x2/Tg2 + \ldots + xn/Tgn$, wherein xn represents the weight fraction (wt. %/100) of the monomer n, and Tgn is the glass transition temperature in Kelvin of the homopolymer of the monomer n. Tg values for homopolymers are listed in Polymer Handbook 2nd Edition, J. Wiley & Sons, New York (1975). The minimum film-forming temperature MFT of the polymers is preferably $-5°$ C. to $+50°$ C., preferably $0°$ C. to $20°$ C., particularly preferably $0°$ C. to $+10°$ C. and most preferably $0°$ C. to $5°$ C.

The preparation of the polymers is carried out in an aqueous medium and preferably by the emulsion polymerization process—as described, for example, in DE-A 102006007282. The polymers are obtained in the form of aqueous dispersions in this process. The usual protective colloids and/or emulsifiers can be employed in the polymerization, as described in DE-A 102006007282. Preferred compounds are partly hydrolyzed or completely hydrolyzed polyvinyl alcohols having a degree of hydrolysis of from 80 to 100 mol %, in particular partly hydrolyzed polyvinyl alcohols having a degree of hydrolysis of from 80 to 94 mol %, and a Höppler viscosity, in 4% strength aqueous solution, of from 1 to 30 mPas (Höppler method at 20° C., DIN 53015). The protective colloids mentioned are accessible by means of processes known to the person skilled in the art and are in general added in the polymerization in an amount of 1 to 20 wt. % in total, based on the total weight of the monomers.

The polymers in the form of aqueous dispersions can be converted by the usual drying processes into corresponding powders which are redispersible in water. In this context, a drying aid is as a rule employed in a total amount of from 3 to 30 wt. %, preferably 5 to 20 wt. %, based on the polymeric constituents of the dispersion. The abovementioned polyvinyl alcohols are preferred as drying aids.

The polymers are preferably in the form of aqueous dispersions stabilized by protective colloids or powders which are stabilized by protective colloids and are redispersible in water.

Typical recipes of the wet concrete mixtures contain 9 to 30 wt. %, in particular 15 to 25 wt.% of cement, such as, for example, Portland cement or blast furnace cement, preferably Portland cement CEM I 42,5, Portland cement CEM I 52,5, Portland silica dust cement CEM II A-D 52,5 or blast furnace cement CEM III 42,5 A. Polymers are employed to the extent of 0.1 to 5.0 wt. %, preferably to the extent of 0.2 to 2.0 wt. %, particularly preferably from 0.5 to 1.5 wt. %, in each case preferably in the form of an aqueous dispersion with a solids content of from 10 to 75 wt. %, particularly preferably from 40 to 60 wt. %. A further constituent is 65 to 90 wt. %, preferably 75 to 90 wt. % of fillers, such as sand or gravel. Setting accelerators are conventionally employed as an additive to the extent of 3 to 10 wt. %, based on the cement content of the aqueous concrete composition. Preferably, aqueous setting accelerators are employed, preferably with a solids content of from 10 to 75 wt. %, particularly preferably from 30 to 60 wt. % and most preferably from 40 to 60 wt. %. Unless stated otherwise, the amounts in wt. % in each case are based on 100 wt. % of dry weight of the recipe. For the preparation of the wet concrete mixtures, conventionally 20 to 80 wt. %, particularly preferably 35 to 65 wt. %, very particularly preferably 40 to 60 wt. % and most preferably 40 to 50 wt. % of water, based on the total weight of the cement employed, are employed.

The usual setting accelerators can be employed, such as, for example, the aluminum compounds, silicates, alkali metal hydroxides or carbonates. Preferred setting accelerators are aluminum salts, aluminates and alkali metal silicates, such as, for example, water-glass, alkali metal carbonates or potassium hydroxide. Particularly preferred setting accelerators are aluminum sulfate, alkali metal aluminates, such as potassium aluminate, aluminum hydroxides, potassium carbonate or sulfoaluminates, such as, for example, calcium sulfoaluminate.

The use properties of the wet concrete mixtures can be improved by further additional substances. Additional substances contained in preferred embodiments of the aqueous concrete compositions are, for example, 0.2 to 2 wt. %, preferably 0.2 to 1.5 wt. % and particularly preferably 0.4 to 1.0 wt. %, based on the cement, of concrete plasticizers (also known as flow agents to the person skilled in the art), or pigments, foam stabilizers, hydrophobizing agents, softening agents, fly ash, disperse silica, air-entraining agents to control the bulk density of the concrete or pumping aids to improve the pumpability. Additives which modulate the setting-accelerating effect of the setting accelerators on the wet concrete mixtures, such as, for example, phosphoric acid, phosphonic acids, polyphosphate, polyhydroxycarboxylic acid or organic additives, in particular polyacrylic acid, hexamethylenetetraamine, alkanolamines, such as, for example, diethanolamine (DEA) or triethanolamine, can furthermore optionally be added to the aqueous concrete compositions.

The preparation of the wet concrete mixtures from the individual constituents of the recipe is not associated with any particular procedure or mixing device. The mixing can be carried out, for example, in a concrete mixer or a ready-mixed concrete mixer.

The use of the polymers has an advantageous effect on a number of properties of the wet concrete mixtures. Thus, the wet concrete mixtures are very readily pumpable even at the abovementioned very low water contents in the method according to the invention. Wet concrete mixtures with relatively low water contents lead to products of higher strength after setting. The use of the polymers in the method according to the invention furthermore leads to an increase in the flow of the wet concrete mixtures, so that the addition of concrete plasticizers or flow agents can be reduced.

The devices known for shotcrete methods, such as, for example, spraying robots or spraying machines, can be employed for applying the wet concrete mixtures to substrates.

The application thickness of the wet concrete mixtures in the method according to the invention is preferably 5 to 40 cm, particularly preferably 5 to 30 cm and most preferably 11 to 20 cm.

When carrying out the method according to the invention, advantageously only a lower rebound arises compared with conventional methods. Rebound is defined as the amount of concrete which does not remain adhering to the substrate on application to a substrate, but falls off and must therefore be disposed of as waste. The rebound when carrying out the method according to the invention is preferably ≤45 wt. %, particularly preferably 3 to 45 wt. % and most preferably 5 to 15 wt. %, in each case based on the total amount of wet concrete mixture applied. The values stated also apply to overhead uses of the method.

The method according to the invention can be used in all the uses of shotcrete methods, including construction, sealing of surfaces, the securing of slopes or the anchoring of rock or stone. The usual concrete constructions are therefore obtainable by the method according to the invention.

Construction includes buildings, shafts, supply routes, bridges, flooring slabs or, preferably, tunnels or mines.

Concrete composites can also be produced by the method according to the invention by applying one or more layers of the wet concrete mixtures on top of one another, it being possible for structural elements optionally to be incorporated between or in the layers.

Suitable structural elements are, for example, steel, water-impermeable films, preferably PE- or PVC-containing films, or water-impermeable membranes. Water-impermeable membranes comprise polymers and cement components and are also known to the person skilled in the art by the term TSL (thin sprayable liner).

For production of the concrete composite, the wet concrete mixtures are preferably applied directly to the optionally steel-reinforced substrate. The layer thickness applied is conventionally between 10 to 40 cm. In the production of thicker concrete layers in particular, it is advantageous to apply the wet concrete mixtures in several layers of application one on top of the other, each with a lower concrete layer thickness. Equally preferably, a concrete composite can also be produced by filling the space remaining between a substrate and a prefabricated component with aqueous concrete compositions, steel reinforcements optionally being incorporated to increase the stability of the composite.

For production of a concrete composite, water-impermeable films or water-impermeable membranes can be incorporated between a component and a layer of a wet concrete mixture or between two layers of wet concrete mixtures, each of which independently of each other are optionally reinforced with steel.

Concrete constructions obtainable by the method according to the invention have a higher impermeability to water compared with corresponding concrete constructions known from the prior art, and furthermore have a higher strength and a lower tendency towards cracking. The concrete constructions produced according to the invention are furthermore characterized by a very good adhesion also to critical substrates, such as wet substrates.

The impermeability of hardened concrete to water is characterized according to DIN1048 via the penetration depth of water into the hardened concrete. A maximum penetration depth according to DIN1048 of up to 50 mm is accepted as the minimum requirement of hardened concrete. Hardened concrete with a low permeability to water has, according to DIN1048, a penetration depth of water of 30 mm. In the method according to the invention, penetration depths of water in the hardened concrete of preferably ≤20 mm and particularly preferably of ≤15 mm are achieved (determined in accordance with DIN 1048).

In contrast to dry shotcrete methods, the wet concrete mixtures according to the invention can be tested for their concrete properties, such as water content, consistency or slump, and if necessary adjusted, before their application to a substrate. The formation of dust which occurs with dry shotcrete methods and the increased rebound which occurs with such methods are also avoided according to the invention. The wet concrete mixtures employed according to the invention are stable during transportation. By separate addition of plasticizer and polymers, for example, any desired suitable w/c values can be established.

The following examples serve for detailed explanation of the invention and are in no way to be understood as meaning a limitation.

Production of concrete drill cores:

COMPARISON EXAMPLE 1

(C. Ex. 1) Wet Shotcrete Method without Polymer

| | |
|---|---|
| 1077 kg | sand (to 4.0 mm grain diameter) |
| 823 kg | gravel (4.0 to 8.0 mm grain diameter) |
| 400 kg | Portland cement CEM I 52, 5 R |
| 20 kg | fly ash Safament |
| 2.7 kg | Muraplast FK 804.2 (concrete plasticizer) |
| 0.465 | w/c value (the w/c value represents the water/cement value and defines the weight ratio of water to cement in the particular wet concrete mixture) |
| 4.0 kg | Retard 360 (retardant) |

The abovementioned components were mixed uniformly in a usual concrete mixer with a volume of 2 m³ by stirring for 2 minutes.

The wet concrete mixture obtained in this way was introduced into a usual spraying robot and applied into formwork (length/height/breadth=70 cm/40 cm/70 cm) via a spray nozzle. During this, a total of 40 kg of setting accelerator Mayco SA 160 was added uniformly to the wet concrete mixture via the spray nozzle.

After storage at 15° C. and a relative atmospheric humidity of 65% for 24 h, cylindrical drill cores with a base area of 200 mm² and a height of 100 mm were drawn from the hardened concrete obtained in this way and stored according to the test duration in accordance with DIN EN 196. The drill cores were then subjected to use testing.

EXAMPLE 2

(Ex. 2): Wet Shotcrete Method with Polymer

In contrast to Comparison Example 1, 1.96 kg of Muraplast FK 804.2, 6.0 kg of Retard 360 and 22 kg of a vinyl acetate/ethylene copolymer, stabilized with polyvinyl alcohol, in the form of a powder (Tg of –7° C., MFT of 0° C.) were added to the wet concrete mixture. The w/c value was 0.465.

EXAMPLE 3

(Ex. 3): Wet Shotcrete Method with Polymer

In contrast to Comparison Example 1, 1.96 kg of Muraplast FK 804.2, 4.0 kg of Retard 360 and 40 kg of an aqueous dispersion of a vinyl acetate/ethylene copolymer stabilized with polyvinyl alcohol (solids content SC of 53%, Tg of –7° C., MFT of 0° C.) were added to the wet concrete mixture. The w/c value was 0.47.

EXAMPLE 4

(Ex. 4): Wet Shotcrete Method with Polymer

In contrast to Example 2, 4.0 kg of Retard 360, but no Muraplast FK 804.2 (concrete plasticizer), were added to the wet concrete mixture and the w/c value was 0.45.

EXAMPLE 5

(Ex. 5): Wet Shotcrete Method with Polymer

In contrast to Example 3, 1.96 kg of Retard 360 were added to the wet concrete mixture and the w/c value was 0.45.

COMPARISON EXAMPLE 6

(C. Ex. 6): Dry Shotcrete Method with Polymer

| | |
|---|---|
| 1077 kg | sand (to 4.0 mm grain diameter) |
| 823 kg | gravel (4.0 to 8.0 mm grain diameter) |
| 300 kg | Portland cement CEM I 52, 5 R |
| 20 kg | aluminum sulfate (solid) accelerator |

The abovementioned components were mixed uniformly in a usual dry mortar mixer with a volume of 2 m³ by stirring for 2 minutes.

The dry concrete mixture obtained in this way was introduced into a usual spraying robot and applied into formwork (length/height/breadth=70 cm/40 cm/70 cm) via a spray nozzle. During this, a total of 40 kg of the aqueous dispersion of a vinyl acetate/ethylene copolymer stabilized with polyvinyl alcohol (solids content SC of 53%, Tg of –7° C., MFT of 0° C.) were added uniformly via the spray nozzle.

Water was also added via the spray nozzle, so that the w/c value of the concrete mixture was 0.45.

Drill cores were obtained as described in Comparison Example 1 from the product obtained in this way.

COMPARISON EXAMPLE 7

(C. Ex. 7): Dry Shotcrete Method with Polymer

In contrast to Comparison Example 6, 20 kg of an aqueous dispersion of a vinyl acetate/ethylene copolymer stabilized with polyvinyl alcohol (solids content SC of 53%, Tg of –7° C., MFT of 0° C.) were added to the concrete dry mixture and no aqueous dispersion of a vinyl acetate/ethylene copolymer stabilized with polyvinyl alcohol (solids content SC of 53%, Tg of –7° C., MFT of 0° C.) was added via the spray nozzle.

Use testing:

Testing of the drill cores of the (comparison) examples in accordance with DIN 1048-5 showed that the drill cores of Comparison Examples 6 and 7 which contained polymers and were not produced by the method according to the invention were dramatically more permeable to water than even the drill core of Comparison Example 1, which contained no polymer (Table 1). The water started to flow through the drill cores of Comparison Examples 6 and 7 after 0.5 days. On the other hand, water had penetrated only very slightly into the drill cores produced by the method according to the invention (Examples 2-5) by the end of the testing in accordance with DIN 1048-5 (Table 1).

The wet concrete mixtures of Examples 2, 3 and 5 were applied with different application thicknesses, but under otherwise in each case identical conditions, to a substrate in a natural tunnel (Table 2). After 7 days the number of moisture-penetrated areas was determined visually for the individual examples. The moisture-penetrated areas manifested themselves by areas of water stains on the side of the concrete applied facing away from the substrate of the tunnel. It is seen from Table 2 that it was possible to reduce the number of moisture-penetrated areas considerably by the procedure according to the invention.

TABLE 1

Determination of the impermeability of hardened concrete to water in accordance with DIN 1048-5:

| | Method | Polymer | Impermeability to water in accordance with DIN 1048-5 [mm] | Duration of testing [days] |
|---|---|---|---|---|
| C. Ex. 1 | wet | — | 24.9 | 3 |
| Ex. 2 | wet | powder | 11.5 | 3 |
| Ex. 3 | wet | dispersion | 13.3 | 3 |
| Ex. 4 | wet | powder | 16.2 | 3 |
| Ex. 5 | wet | dispersion | 14.5 | 3 |
| C. Ex. 6 | dry | dispersion | 31.2 | 0.5[a] |
| C. Ex. 7 | dry | powder | 34.7 | 0.5[a] |

[a] The drill core proved to be so permeable that the water started to flow through the drill core after 0.5 days.

TABLE 2

Permeability of hardened concrete to water as a function of the application thickness of the concrete:

| Number of moisture-penetrated areas per 10 m²: | C. Ex. 1 | Ex. 2 | Ex. 3 | Ex. 5 |
|---|---|---|---|---|
| 12 to 13 cm application thickness | 8-10 | 1-2 | 1-2 | 1-2 |
| approx. 2 cm application thickness | >30 | 7-9 | 7-9 | 7-9 |

The polymer-modified fresh concrete compositions of Examples 2-5 show the desired storage stability and are therefore stable to transportation, which manifests itself in the same flow directly after mixing of the components of the wet concrete mixture and after storage for one hour (Table 3). By reducing the w/c value (Example 4), it was possible to reduce the flow without impairing the pumpability. Furthermore, by reducing the w/c value the early strength of concrete can be improved (Example 4). On carrying out the method according to the invention, a lower rebound moreover occurs.

TABLE 3

Testing of the fresh concrete properties:

| | C. Ex. 1 | Ex. 2 | Ex. 3 | Ex. 4 | Ex. 5 |
|---|---|---|---|---|---|
| w/c value | 0.465 | 0.465 | 0.470 | 0.450 | 0.450 |
| Flow[a] | 58 cm | 58 cm | 57 cm | 52 cm | 58 cm |
| Flow after storage for 1 h[b] | 58 cm | 58 cm | 57 cm | 52 cm | 58 cm |
| Rebound[c] | 100 | 50 | 50 | 50 | 50 |
| Compressive strength after 7 days ([N/mm²])[d] | 17.0 | 17.1 | 22.1 | 29.3 | not determined |
| Compressive strength after 28 days ([N/mm²])[d] | 36.9 | 35.6 | 39.8 | 36.1 | not determined |

[a] The flow was determined in accordance with DIN 12350 part 5 after mixing of the individual components of the wet concrete mixture.
[b] The flow was determined in accordance with DIN 12350 part 5 after storage of the wet concrete mixture for 1 hour.
[c] The values relate to the result with Comparison Example 1.
[d] The determination of the compressive strength of the set concrete was carried out in accordance with DIN EN 12504-1.

The invention claimed is:

1. A method for applying a wet concrete mixture containing cement, fillers, water, one or more polymers in the form of either aqueous dispersions stabilized by protective colloids or powders redispersible in water and stabilized by protective colloids., and optionally further additional substances or additives by the wet shotcrete method;
   wherein the one or more polymers comprise at least a copolymer of vinyl acetate with ethylene, a copolymer of vinyl acetate with ethylene and one or more further vinyl esters, a copolymer of vinyl acetate with ethylene and an acrylic acid ester, or a copolymer of vinyl acetate with ethylene and vinyl chloride;
   wherein the wet concrete mixture is introduced into a concrete spraying machine and applied to a substrate by means of a wet shotcrete method with a layer thickness of ≥3cm;
   wherein the vinyl esters are chosen from the group consisting of vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 9 to 13 C. atoms; and
   wherein after hardening the concrete has a water penetration depth of 50 mm.

2. The method for applying a wet concrete mixture as claimed in claim 1, wherein the polymers have glass transition temperatures Tg of from −50° C. to +50° C.

3. The method for applying a wet concrete mixture as claimed in claim 1, wherein the content of the polymers is 0.1 to 5.0 wt. %, based on the dry weight of the wet concrete mixture.

4. The method for applying a wet concrete mixture as claimed in claim 1, wherein 20 to 80 wt. % of water is employed, based on the total weight of the cement employed in the wet concrete mixture.

5. The method for applying a wet concrete mixture as claimed in claim 1, wherein 0.2 to 2 wt. %, based on the total weight of the cement employed in the wet concrete mixture, of concrete plasticizers are employed as an additional substance.

6. The method for applying a wet concrete mixture as claimed in claim 1, wherein the method is used to apply wet concrete to a construction structure, a surface sealing, or for securing a slope or for anchoring rock or stone.

7. The method for applying a wet concrete mixture as claimed in claim 1, wherein the method is used to apply wet concrete to a surface of a building, shaft, supply route, bridge, flooring slab, tunnel or mine.

8. The method for applying a wet concrete mixture as claimed in claim 1, wherein after hardening the concrete has a water penetration depth of ≤20 mm.

9. The method according to claim 1, wherein the wet concrete mixture contains at least a copolymer of vinyl acetate with ethylene.

* * * * *